United States Patent [19]

Sato et al.

[11] 4,291,138

[45] Sep. 22, 1981

[54] PRODUCTION OF MODIFIED POLYPROPYLENES

[75] Inventors: Hideo Sato, Yokkaichi; Toshio Yagi, Aichi, both of Japan

[73] Assignee: Mitsubishi Petrochemical Co., Ltd., Japan

[21] Appl. No.: 95,922

[22] Filed: Nov. 19, 1979

[30] Foreign Application Priority Data

Nov. 24, 1978 [JP] Japan ................................ 53-145164

[51] Int. Cl.$^3$ ............................................ C08F 297/08
[52] U.S. Cl. .................................. 525/247; 525/245; 525/323
[58] Field of Search ...................... 525/245, 247, 323

[56] References Cited

U.S. PATENT DOCUMENTS 4,066,718  1/1978  Saito .................................... 525/323

*Primary Examiner*—Paul R. Michl
*Attorney, Agent, or Firm*—Robert E. Burns; Emmanuel J. Lobato; Bruce L. Adams

[57] ABSTRACT

A modified polypropylene having improved impact resistance is obtained by producing, in the presence of a stereoregular polymerization catalyst and in three steps, two types of polypropylene blocks formed stepwise at different temperatures and then poly(ethylene or ethylene/propylene) block, the polymerization temperatures employed and the quantities of polymers produced in each step being in specific ranges.

11 Claims, No Drawings

PRODUCTION OF MODIFIED POLYPROPYLENES

BACKGROUND OF THE INVENTION

1. Field of the Invention

This invention relates to a process for producing modified polypropylenes containing propylene-ethylene copolymer blocks.

As a method for improving the impact resistance of polypropylenes while maintaining their desirable properties, a method for block-copolymerization wherein polymer blocks comprising an ethylene unit are introduced into the polypropylene has been known. The block copolymer can be produced by polymerizing propylene and ethylene stepwise in the presence of a stereoregular polymerization catalyst. The conventional method for this purpose comprises producing polypropylene and then copolymerizing ethylene or an ethylene-propylene mixture with the resulting polypropylene. If desired, polyethylene- or poly(ethylene/propylene)-block is additionally formed. By this conventional method, a modified polypropylene having some impact resistance is obtained. This impact resistance, however, cannot be said to be satisfactory high.

SUMMARY OF THE INVENTION

It is an object of this invention to produce a modified polypropylene having excellent impact resistance wherein the above mentioned problems have been solved. This object has been achieved by producing two types of polypropylene blocks formed stepwise at different temperatures and poly(ethylene or propylene-/ethylene) blocks in three steps.

Thus, the process for producing a modified polypropylene in accordance with the present invention is characterized by the combination of the following steps 1, 2, and 3 which are carried out in the presence of a stereoregular polymerization catalyst. Quantities given in percent (%) in this disclosure are by weight.

Step 1

Propylene is polymerized at a temperature of not higer than 60° C., to produce 0.5 to 30% of a crystalline propylene polymer on the basis of the total polymerization product obtained in Steps 1 through 3.

Step 2

Propylene is further polymerized at a temperature which is at least 5° C. higher than that of Step 1, to produce 60 to 95% of a crystalline propylene polymer on the basis of the total polymerization product, the quantity of the crystalline propylene polymer being the total quantity through Steps 1 and 2.

Step 3

Ethylene or an ethylene-propylene mixture is polymerized to produce 5 to 40% of an ethylene polymer on the basis of the total polymerization product, the ethylene content in the ethylene polymer being 100 to 20%.

One of the features of the process of the present invention is that two types of polypropylene blocks are produced stepwise at different temperatures, and the former step of the two steps is carried out at a low temperature of not higher than 60° C. More particularly, by producing a crystalline propylene polymer in the first step, the resulting block copolymer can be provided with excellent properties such as high rigidity, high softening point and the like which are characteristic of polypropylenes. Thus, polymerization is initiated in the former step by contacting propylene with a stereoregular polymerization catalyst at a temperature of lower than 60° C. and a relatively small amount of polypropylene is produced in the former low temperature step, whereby the impact resistance of the finally-produced modified polypropylene can be markedly improved. (Reference is made to Comparative Examples 1 and 2 set forth hereinafter.)

It is also required in the present invention that the ethylene content in the ethylene polymer block be in the range of 100 to 20%. The impact resistance of the resulting modified polypropylene is greatly improved when the ethylene content is not less than 20%. (Reference is made to Comparative Example 4.)

DETAILED DESCRIPTION OF THE INVENTION

The process of the present invention is carried out essentially as in the conventional stereoregular polymerization of propylene or the like and the block copolymerization of propylene and ethylene, except that consideration is given to the condition of the polymerization temperatures to be employed and the quantity of each block to be produced in each polymerization step.

1. Stereoregular Polymerization

A catalyst generally employed in the stereoregular polymerization of propylene, ethylene, etc. can be used as the catalyst for the present invention.

Most representative is a complex catalyst comprising a transition metal halide component and an organo-aluminum compound component.

As the transition metal halide, titanium halides are preferably used and titanium trichloride and titanium tetrachloride are especially preferred. Examples of the titanium trichloride to be used in the catalyst are a reduction product of titanium tetrachloride reduced by a conventional method, the above mentioned reduction product which has been activated by a ballmill treatment or/and a washing treatment with a solvent (washing with an inert solvent or/and a polar compound-containing inert solvent), and a modified titanium compound mixture prepared by co-milling titanium trichloride or a titanium trichloride eutectic crystal mixture (such as $TiCl_3 \cdot 1/3AlCl_3$) with any of electron donors such as amines, ethers, esters, derivatives of sulfur or halogen, organic or inorganic nitrogen- or phosphorus-compounds, etc.

Representative compounds which can be used as electron donors are ethers and esters. Among these, a $C_1$–$C_{12}$ alkyl ester selected from $\alpha, \beta$ unsaturated aliphatic carboxylates and aromatic monocarboxylates is suitable. More specifically, ethyl benzoate, ethyl paratoluate, ethyl paraanisate, and the like are preferable.

An electron donor of this character is used in a quantity, in general, of 0.001 to 2 mols, preferably 0.01 to 1 mol with respect to 1 mol of the transition metal halide compound.

The titanium trichloride, titanium tetrachloride, and other titanium halides can also be employed in a form wherein they are supported on magnesium halides such as magnesium chloride.

As the organo-aluminum compound to be combined with such a transition-metal catalyst component, a compound represented by the formula $AlR_nX_{3-n}$ is suitable.

In this formula: R is an alkyl group with two to six carbon atoms; X is a halogen, especially chlorine; and n is a number defined as $0 < n \leq 3$. Examples of such a compound are dimethylaluminum chloride, diethylaluminum chloride, ethylaluminum sesquichloride, ethylaluminum dichloride, triethylaluminum, and mixtures thereof.

The molar ratio of these two components is generally in the range of 1 mol of the transition metal compound to 1 to 300 mols, preferably from about 1 to about 100 mols of the organo-aluminum compound.

Furthermore, an electron donor can be added to the catalyst system when necessary.

Representative compounds which can be used as electron donors are ethers and esters. Among these, a $C_1$-$C_{12}$ alkyl ester selected from $\alpha$, $\beta$ unsaturated aliphatic carboxylates and aromatic monocarboxylates is suitable. More specifically, ethyl benzoate, ethyl paratoluate, ethyl paraanisate, and the like are preferable.

An electron donor of this character is used in a quantity, in general, of 0.01 to 10 mols, preferably 0.1 to 0.7 mol with respect to 1 mol of the o-rganoaluminum compound.

2. Formation of Crystalline Propylene Polymer Blocks (Steps 1 and 2)

In the Step 1 of the present invention, the polymerization of propylene is initiated at a temperature of not higher than 60° C., preferably at 50° C. to room temperature and most preferably at 40° to 20° C. The polymerization is continued until the polymerized quantity reaches 0.5 to 30%, preferably 1 to 10% of the total polymerization product obtained in Steps 1 through 3. The temperature in Step 1 may not be required to be always constant through Step 1 provided that it is not higher than 60° C. The lower limit is about 0° C. When the temperature at which the polymerization of propylene is initiated is above 60° C., a polymerization product having a quality balance which is markedly excellent in both rigidity and impact resistance cannot be obtained.

In the subsequent second stage (Step 2), the polymerization of propylene is carried out at a temperature of at least 5° C. and preferably at least 10° C. higher than that of Step 1. The polymerization temperature itself in the Step 2 is not especially restricted provided that the above-mentioned difference in the temperature exists, but is generally preferred to be a temperature above 50° C. and especially above 65° C. The polymerization temperature set at a relatively higher level is industrially preferred from the viewpoint of the catalytic efficiency and the heat-removal efficiency of the polymerization reactors. The upper limit of the polymerization temperature in Step 2 is generally about 90° C. The temperature in Step 2 may not be required to be always kept constant through Step 2.

The polymerized quantity in Step 2 should be controlled to be 60 to 95% and preferably 75 to 93% of the total polymer quantity produced through Steps 1 and 2 on the basis of the total polymerization product obtained in Steps 1 through 3.

If the content of the crystalline propylene polymer blocks produced through these two steps is less than 60% of the total polymerization product, the resulting modified polypropylene will fail to fully exhibit the excellent properties of polypropylene, especially those such as high rigidity and high softening point.

These two steps can be carried out according to any polymerization process which can be applied to the stereoregular polymerization of propylene such as slurry-in-solvent polymerization, non-solvent liquid phase polymerization, and gas-phase polymerization. Slurry-in-solvent polymerization, however, is typically employed. The polymerization pressure is generally at 1 to about 50 Kg/cm$^2$ (absolute pressure (abs.)), and particularly in slurry-in-solvent polymerization is usually about 1 to about 12 Kg/cm$^2$. abs.

Step 2 is normally carried out by addition-polymerizing propylene additional to the "active" polypropylene obtained in Step 1, wherein a further catalyst is not generally supplemented. If desired, however, the catalyst can also be added upon starting Step 2 or in the course of Steps 1 and 2.

These two steps can be carried out either in a single polymerization reactor or in reactors respectively for the two steps connected in series.

In this connection, provided that the excellent contribution which the crystalline propylene polymer makes to the properties of the modified polypropylene of the present invention is not impaired, the propylene monomer used in Steps 1 and 2 may contain a small amount of a copolymerizable manner such as ethylene, isobutylene, or 1-butene. The monomer may also contain hydrogen or the like as a molecular weight modifier.

3. Formation of Ethylene Polymer Block (Step 3)

The process in Step 3 is carried out essentially in the same way as in the process of the Step 2 (and the Step 1), except that the monomer to be polymerized is ethylene or a mixture of ethylene and propylene.

The ethylene content contained in the block formed in Step 3 is 100 to 20% and preferably 90 to 30%. When the ethylene content is less than 100%, the balance is propylene, or may be propylene and a small amount of a copolymerizable monomer such as isobutylene and 1-butene provided that the presence of such a copolymerizable monomer does not unduly impair the properties of the resulting modified polypropylene.

The polymerized quantity in Step 3 is 5 to 40% and preferably 7 to 25% of the total polymerization product obtained in Steps 1 through 3. A sufficient impact resistance cannot be obtained when the polymerized quantity in Step 3 is less than 5%, and the excellent properties which polypropylene possesses cannot be exhibited when the polymerized quantity is more than 40%.

Step 3 is generally carried out at a temperature of not higher than 100° C., preferably in the range of 20° to 80° C., and under pressure of about 1 to 50 Kg/cm$^2$ abs., preferably under a pressure of atmospheric pressure to 30 Kg/cm$^2$ abs. Step 3 is carried out substantially in the same way as in Step 2 (and Step 1) with respect to the polymerization processes, polymerization reactors, use of the catalyst with or without further addition thereof, and so forth.

4. Examples of Experiments

EXAMPLE 1

A polymerization reactor of 100-liter capacity was charged with 40 g of titanium trichloride and 80 g of diethylaluminum monochloride together with 45 liters of heptane.

(Step 1)

As the first step of the polymerization, the polymerization temperature was raised to 40° C., and propylene was supplied to raise the pressure to 1 Kg/cm$^2$G. Polymerization of propylene was continued until the polymerized quantity reached 1 Kg.

(Step 2)

As the second step of the polymerization, the polymerization temperature was then raised to 75° C., and propylene was supplied at a rate of 5 Kg/hr. The polymerization of propylene was continued at a temperature of 75° C. until the polymerized quantity reached 19 Kg.

(Step 3)

In the subsequent third step of polymerization, unreacted propylene was purged until its pressure reached 0.5 Kg/cm$^2$ (gauge pressure (G)). Ethylene was then supplied at a rate of 2 Kg/hr, and copolymerization was carried out at 75° C. until the quantity of polymerized ethylene reached 2.6 Kg, the quantity of propylene copolymerized simultaneously being 0.4 Kg.

To the resulting polymer slurry was added 3 liters of butanol to terminate the polymerization. The mixture was subjected to a catalyst-decomposition operation for 1 hour. The product was then subjected to centrifuging, washing with water, and drying to obtain a white powdery copolymer.

The properties of the copolymer thus obtained are shown in Table 1.

Comparative Example 1

The process of Example 1 was repeated to produce a copolymer, except that propylene was polymerized at a temperature of 75° C. from the initiation of the polymerization until the quantity of polymerized propylene reached 20 Kg.

The properties of the resulting copolymer are also shown in Table 1.

TABLE 1

| Properties | Example 1 | Comparative Example 1 |
|---|---|---|
| MI (g/10 minutes) | 0.9 | 1.0 |
| Ethylene content (% by wt.) | 12 | 11 |
| Impact strength (Kg-cm/cm$^2$) | 23 | 15 |
| Rigidity (Kg/cm$^2$) | 11500 | 10700 |

MI (melt index): ASTM D1238-57T method (temperature 230° C., load 2,160 g)
Ethylene content: IR analysis
Impact strength: Charpy impact strength test (20° C.) Japanese Industiral Standards JIS B-7722
Rigidity: ASTM D747-50 method From the results, it is apparent that a modified polypropylene which was prepared by initiating the polymerization at a temperature higher than 60° C. has insufficient impact resistance and rigidity.

EXAMPLE 2

A 100-liter capacity polymerization reactor was charged with 40 g of titanium trichloride and 80 g of diethylaluminum monochloride together with 45 liters of heptane.

(Step 1)

The polymerization temperature was raised to 30° C., and propylene was then supplied to raise the polymerization pressure to 1 Kg/cm$^2$G. The polymerization of propylene was continued until the quantity of polymerized propylene reached 0.5 Kg.

(Step 2)

The polymerization temperature was then raised to 75° C., and propylene was supplied at a rate of 5 Kg/hr. Polymerization was continued at 75° C. until the quantity of polymerized propylene reached 19.5 Kg.

(Step 3)

Unreacted propylene was purged until the pressure became 0.5 Kg/cm$^2$G, and ethylene was then supplied at a rate of 2 Kg/hr. Copolymerization was continued at 70° C. until the quantity of polymerized ethylene reached 2.6 Kg, the quantity of the propylene copolymerized simultaneously being 0.4 Kg.

The polymer slurry thus obtained was subjected to post-treatment similarly as in Example 1 to obtain a white powdery copolymer. The properties of the resulting copolymer are shown in Table 2.

Comparative Example 2

Polymerization and post-treatment were carried out as in Example 2, except that the first step polymerization was carried out at a polymerization temperature of 70° C.

The properties of the resulting copolymer are shown in Table 2. This Comparative Example 2 is set forth to show the effect of a higher temperature in the polymerization Step 1.

EXAMPLE 3

A 100-liter capacity polymerization reactor was charged with 40 g of titanium trichloride and 80 g of diethylaluminum monochloride together with 45 liters of heptane.

(Step 1)

The temperature in the polymerization reactor was raised to 50° C., and propylene was then supplied until the pressure became 2 Kg/cm$^2$G. The polymerization of propylene was continued until the polymerized quantity of the propylene reached 2 Kg.

(Step 2)

The polymerization temperature was then raised to 75° C., and propylene was supplied at a rate of 5 Kg/hr. The polymerization was continued until the polymerized quantity of the propylene reached 18 Kg.

(Step 3)

Unreacted propylene was then purged until the pressure became 0.5 Kg/cm$^2$G, and then ethylene was supplied at a rate of 2 Kg/hr. Copolymerization was carried out at a temperature of 70° C. until the polymerized quantity of the ethylene reached 2.6 Kg, the quantity of the propylene copolymerized simultaneously being 0.4 Kg.

The polymer slurry thus obtained was subjected to post-treatment as in Example 1 to obtain a white powdery copolymer.

The properties of the resulting copolymer are shown in Table 2.

Comparative Example 3

Polymerization and post-treatment were carried out as in Example 3, except that the first step polymerization was carried out under a pressure of 1 Kg/cm$^2$ until the polymerized quantity of the propylene reached 70 g, and the polymerization in the second step was continued until the polymerized quantity of the propylene reached 20 Kg.

The properties of the resulting copolymer are shown in Table 2. This Comparative Example 3 is set forth to show the effect when a small amount of the crystalline propylene polymer was produced in the first step.

EXAMPLE 4

A 100-liter capacity polymerization reactor was charged with 40 g of titanium trichloride and 80 g of diethylaluminum monochloride together with 45 liters of heptane.

(Step 1)

The polymerization temperature was raised to 40° C., and then propylene was supplied to bring the pressure up to 1 Kg/cm²G. The polymerization of the propylene was continued until the polymerized quantity of the propylene reached 1 Kg.

(Step 2)

The polymerization temperature was then raised to 75° C., and propylene was supplied at a rate of 5 Kg/hr. Polymerization was continued at 75° C. until the polymerized quantity of the propylene reached 18 Kg.

(Step 3)

Unreacted propylene was purged until the pressure became 0.5 Kg/cm²G. Ethylene was then supplied at a rate of 1.1 Kg/hr. At the same time, propylene was also supplied at a rate of 0.9 Kg/hr. Copolymerization was carried out at 70° C. until the polymerized quantity of the ethylene reached 2.0 Kg, the quantity of the propylene copolymerized simultaneously being 1.5 Kg.

The polymer slurry thus obtained was subjected to post-treatment as in Example 1, whereupon a white powdery copolymer was obtained. The properties of the resulting copolymer are shown in Table 2.

EXAMPLE 5

The process of Example 4 was repeated except that, in the third step, the copolymerization was carried out at 70° C. by supplying ethylene at a rate of 1.1 Kg/hr and propylene simultaneously at a rate of 0.4 Kg/hr until the polymerized quantity of the ethylene reached 1.3 Kg. The quantity of the propylene copolymerized at this time was 0.4 Kg.

The properties of the resulting copolymer were shown in Table 2.

Comparative Example 4

The process of Example 4 was repeated except that, in the third step, the copolymerization was carried out at 70° C. by supplying ethylene at a rate of 0.2 Kg/hr and propylene simultaneously at a rate of 2 Kg/hr until the polymerized quantity of the ethylene reached 0.3 Kg. The quantity of the propylene copolymerized at this time was 2.9 Kg.

The properties of the resulting copolymer are shown in Table 2.

Comparative Example 4 is set forth to show the effect when the ethylene content in the polymer obtained in the third step is smaller.

Comparative Example 5

The process of Example 4 was repeated except that, in the third step, the copolymerization was carried out at 70° C. by supplying ethylene at a rate of 0.5 Kg/hr and propylene simultaneously at a rate of 0.5 Kg/hr until the polymerized quantity of the ethylene reached 0.3 Kg. The quantity of the propylene copolymerized at this time was 0.3 Kg.

The properties of the resulting copolymer are shown in Table 2.

Comparative Example 5 is presented to show the effect when the amount of the polymer produced in the third step is smaller.

TABLE 2

| | Step 1 | Step 2 | Step 3 | | | Properties of Product | | | |
|---|---|---|---|---|---|---|---|---|---|
| | Polymerization temperature (°C.) | Polymerized quantity (%) | Polymerized quantity (%) | E / (E + P) (%) | Polymerized quantity (%) | MI (g/10 min.) | Ethylene content (wt. %) | Impact strength (Kg-cm/cm²) | Rigidity (Kg/cm²) |
| EX. 1** | 40 | 4.4 | 82.6 | 86.7 | 13.0 | 0.9 | 12 | 23 | 11500 |
| C. EX. 1 | 75 | 87.0 | — | 86.7 | 13.0 | 1.0 | 11 | 15 | 10700 |
| EX. 2 | 30 | 2.2 | 84.8 | 86.7 | 13.0 | 0.9 | 11 | 24 | 11400 |
| C. EX. 2 | 70 | 2.2 | 84.8 | 86.7 | 13.0 | 1.2 | 11 | 16 | 11000 |
| EX. 3 | 50 | 8.7 | 78.3 | 86.7 | 13.0 | 1.1 | 11 | 22 | 11700 |
| C. EX. 3 | 50 | 0.3 | 86.7 | 86.7 | 13.0 | 1.3 | 11 | 14 | 10900 |
| EX. 4 | 40 | 4.4 | 80.0 | 57.1 | 15.6 | 1.4 | 7 | 20 | 11000 |
| EX. 5 | 40 | 4.8 | 87.0 | 76.5 | 8.2 | 1.0 | 5 | 21 | 12500 |
| C. EX. 4 | 40 | 4.5 | 81.1 | 9.3 | 14.4 | 1.5 | 1 | 5 | 9300 |
| C. EX. 5 | 40 | 5.1 | 91.8 | 50.0 | 3.1 | 1.3 | 1 | 6 | 12700 |

Note:
*E = ethylene, P = propylene
**EX. = Example, C. EX. = Comparative Example.

What is claimed is:

1. A process for producing a modified polypropylene in the presence of a stereoregular polymerization catalyst which comprises, in combination:
   Step 1 wherein propylene is polymerized at a temperature of not higher than 60° C. to produce 0.5 to 30% by weight of a crystalline propylene polymer on the basis of the total polymerization product obtained in Steps 1 through 3;
   Step 2 wherein propylene is further polymerized at a temperature which is at least 10° C. higher than that of Step 1 to produce 60 to 95% by weight of a crystalline propylene polymer on the basis of the total polymerization product in Steps 1 through 3, the quantity of the crystalline propylene polymer being the total quantity through Steps 1 and 2; and
   Step 3 wherein a member selected from the group consisting of ethylene and an ethylene-propylene mixture is polymerized to produce 5 to 40% by weight of an ethylene polymer on the basis of the total polymerization product in Steps 1 through 3, the ethylene content in the resulting ethylene polymer being 100 to 20% by weight.

2. The process as set forth in claim 1, in which the stereoregular polymerization catalyst is a complex catalyst comprising a transition metal halide component and an organo-aluminum compound component.

3. The process as set forth in claim 2, in which the molar ratio of the components contained in the catalyst is in the range of 1 mol of the transition metal compound to from about 1 to about 300 mols of the organo-aluminum compound.

4. The process as set forth in claim 1, in which the polymerization of propylene in Step 1 is carried out at a temperature of about 50° C. to room temperature under a pressure of about 1 to about 50 Kg/cm$^2$ (absolute pressure).

5. The process as set forth in claim 1, in which the polymerization of propylene in Step 1 is continued until the polymerized quantity reaches about 1 to about 10% by weight on the basis of the total polymerization product obtained in Steps 1 through 3.

6. The process as set forth in claim 1, in which the polymerization of propylene in Step 2 is carried out under a pressure of about 1 to about 50 Kg/cm$^2$ (absolute pressure).

7. The process as set forth in claim 1, in which the polymerization in Step 3 is carried out at a temperature which is not higher than about 100° C. and under a pressure of about 1 to 50 Kg/cm$^2$ (absolute pressure).

8. The process as set forth in claim 1, in which the polymerized quantity in Step 3 is about 7 to about 25% by weight on the basis of the total polymerization product obtained in Steps 1 through 3.

9. The process as set forth in claim 1, in which the ethylene content in the ethylene polymer formed in Step 3 is about 90 to about 30% by weight.

10. The process as set forth in claim 9, in which the balance relative to the ethylene content is propylene or a mixture of propylene and a small amount of a copolymerizable monomer.

11. The process of claim 1 in which Step 1 is carried out at a temperature of about 50° C. to room temperature under a pressure of about 1 to about 50 Kg/cm$^2$ absolute, Step 2 is carried out at a temperature from above about 65° C. to about 90° C. under a pressure of about 1 to about 50 Kg./cm$^2$ absolute and Step 3 is carried out at a temperature in the range of about 20° C. to 80° C. under a pressure of about 1 to about 50 Kg/cm$^2$ absolute.

* * * * *